DEVICE FOR THE MAGNETIC RECORDING
ON, AND REPRODUCING FROM, DISK
SHAPED SOUND CARRIERS

Filed Feb. 27, 1948 2 Sheets-Sheet 1

Inventor
Willy Müller
and
Oskar Grimm
By Singer Ehlert Stern & Carlberg
attys.

DEVICE FOR THE MAGNETIC RECORDING ON, AND REPRODUCING FROM, DISK SHAPED SOUND CARRIERS

Filed Feb. 27, 1948 2 Sheets-Sheet 2

Inventor
Willy Müller and
Oskar Grimm
By Singer, Ehlert, Stern & Carlberg, attys Patented Aug. 22, 1950

2,519,592

UNITED STATES PATENT OFFICE 2,519,592

DEVICE FOR THE MAGNETIC RECORDING ON, AND REPRODUCING FROM, DISK-SHAPED SOUND CARRIERS

Willy Müller, Zurich, and Oskar Grimm, Kusnacht, Switzerland, assignors to Daphné Investment Trust, Vaduz, Liechtenstein Application February 27, 1948, Serial No. 11,814
In Switzerland December 23, 1947

3 Claims. (Cl. 179—100.2)

The invention relates to a process and to an apparatus for the magnetic recording and reproducing of sound on and from disc shaped sound carriers, respectively.

The invention has the object of substantially increasing the recording capacity of a disc shaped sound carrier.

Hitherto one has been compelled to use pick-up cores of 2 millimeter pole width or more in order to obtain a sufficient reproduction voltage. Since one must not go below a certain minimum distance of the recorded sound tracks from one another, the recording capacity for a given sound frequency of speech was determined thereby.

In order nevertheless to achieve a greater recording capacity on one and the same size of sound carrier, one has hitherto made a sound track first on the one side and then on the other side of the disc. This however necessitates with automatic devices a very involved and complicated apparatus that switches over to the other side in the moment when reproducing of one side has finished. Particularly with telephonographic devices these switch apparatuses offer almost insurmountable difficulties.

According to the invention these difficulties are obviated in a surprisingly simple manner by operating with a pick-up having a pole width of .1 millimeter or less and with a distance of adjacent sound tracks from one another of .05 millimeter or less for recording and reproducing. With a disc shaped sound carrier a pick-up of half the pole width allows theoretically to record on a spiral track of half the spiral angle whereby twice the number of turns and accordingly twice the recording capacity on one and the same side of the disc is attained.

Of course by the narrowing of the pole width of the pick-up the reproduction voltage is diminished proportionally to the pole width. In order nevertheless to achieve recording and/or reproducing that satisfies all requirements, according to another facture of the invention, two pick-ups are put into operation simultaneously on the upper and lower side of the sound carrier. As will be seen, the recording capacity of each individual side of the disc is doubled thereby, while that of the disc as a whole remains substantially the same. But the essential advantage is achieved that any switching-over from one side to the other can be dispensed with.

The idea of operating simultaneously with two pick-ups allows moreover to improve the quality of the recording and reproduced sound, particularly with large discs of e. g. 300 millimeters diameter. When using such plates the circumferential velocity relatively to the pick-ups varies on their path across the radius of the disc. If two pick-ups are arranged in series and are mounted, according to a further feature of the invention, on a common fork shaped carrier in such a manner that the one pick-up is at the beginning of recording or reproducing at the inner end of its associated sound track, and the other pick-up is at the outer end of its corresponding sound track, whereafter they move oppositely i. e. the one from inside outwards and the other outside inwards, the different circumferential velocities of the sound carrier disc with respect to the pick-ups have the effect, that the outer pick-up records and/or reproduces at the higher circumferential velocity mainly the high sound frequencies, and the inner pick-up at the lower velocity mainly the lower sound frequencies. Since at reproduction the voltages produced by the two pick-ups supplement one another, one attains in this manner an improved and constant quality of sound reproduction.

It is well known that hitherto variable speed drive aggregates were required for sound carrier discs the sound tracks of which would otherwise have had varying circumferential velocities, in order to attain a constant quality of reproduction.

The inventive idea as set forth hereabove will now be ascertained with reference to the accompanying drawings which show diagrammatically how and by means of what kind of device it can for example be performed in practice.

Figure 1:
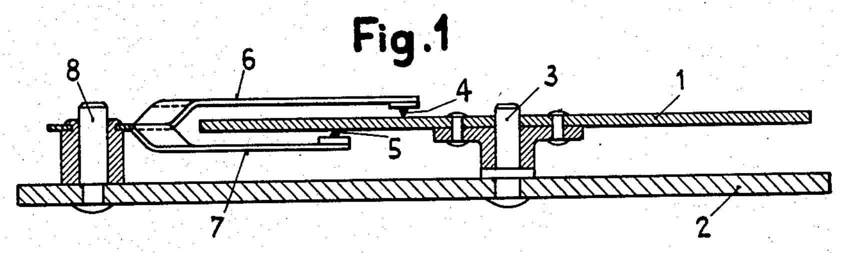
Fig. 1 is a diagrammatic elevation, partly in section of an apparatus for magnetically recording sound on, or reproducing it from, a disc shaped carrier.

In the drawing, 1 denotes the disc shaped sound carrier which is rotatably arranged on the pin 3 fixed to the plate 2. The plate 1 is connected, for example by means of rivets 10, to the flange of a hub 11 which has a worm wheel 11*a* (Fig. 1*a*) in mesh with a worm 12 on a spindle 13 driven by the electric motor 14. Said spindle carries another worm 15 in mesh with a worm wheel segment 16 pivoted on an axis 8. Two picks-ups 4, 5 (Fig. 1*b*) are arranged, the one top of the other below the disc 1. These picks-ups are arranged on the rigidly connected arms 6, 7 that form together a fork-shaped carrier and are, as a whole, pivoted about the said axis 8 and connected with the segment 16. The pole gap of the two pick-ups (which cause longitudinal magnetisation of the sound track) is only about half of that of the usual single pick-up that would produce the same voltage of reproduction as the two pick-ups according to the invention together, and amounts to .2 millimeter or less, the distance of adjacent sound tracks being .05 millimeter or less. With a frequency of speech of about 3000 hekacycles per second and a disc diameter of 300 millimeters a recording period and/or reproducing period of about 30 minutes was attained.

Figure 2:
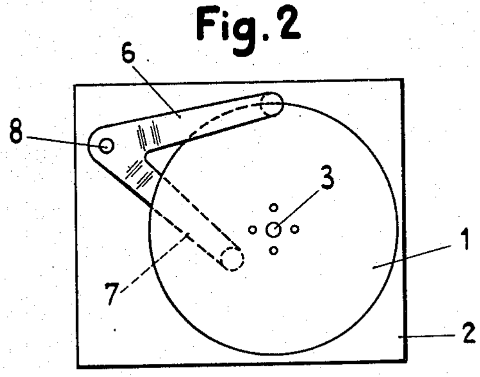
Figs. 2 to 4 are diagrammatic plan views on a smaller scale in various positions of the pick-ups with respect to the sound carrier.
Figure 3:
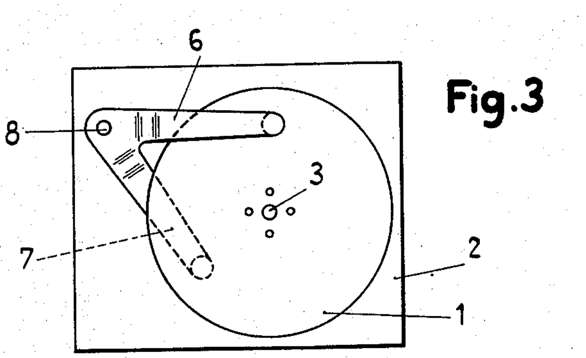
Figure 4:
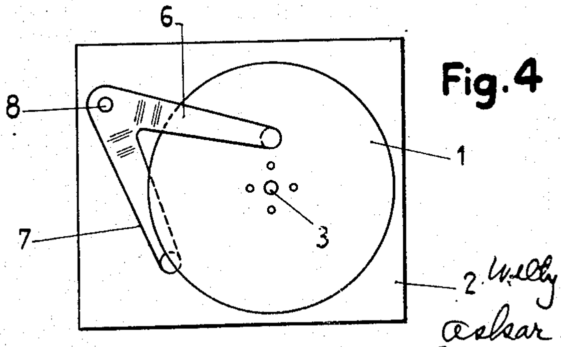
Figure 1A:
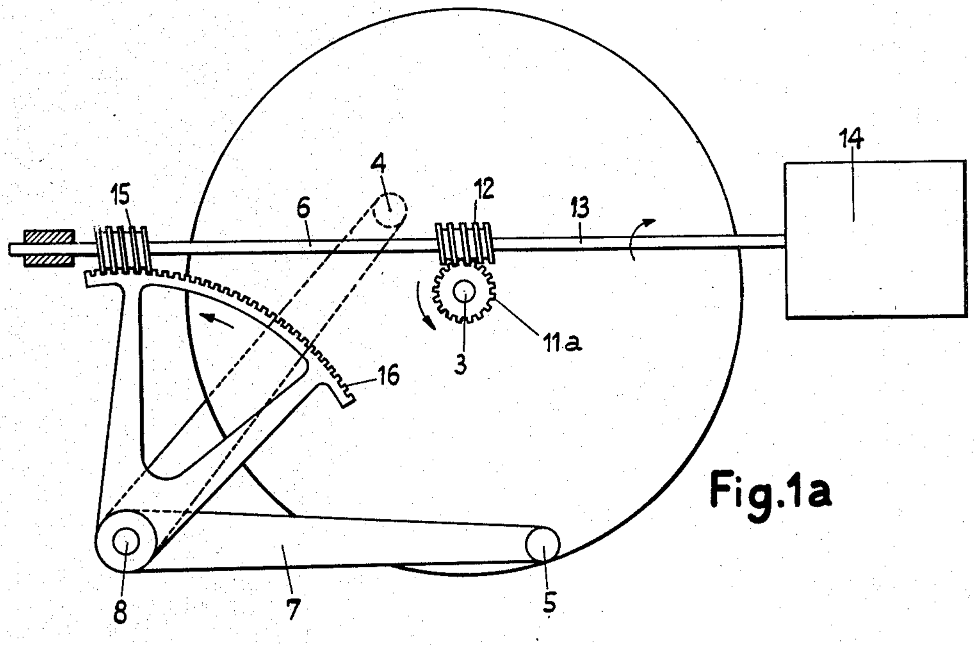
Fig. 1*a* is a plan view as seen from below.
Figure 1B:
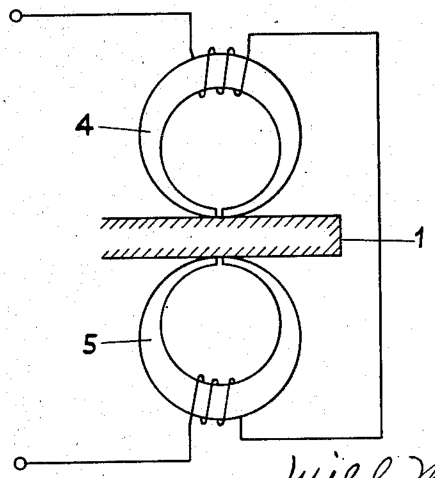
Fig. 1*b* is a diagrammatic part section on a larger scale.

As will be seen from the plan views in Figs. 2 to 4 the two arms 6, 7 which are rigidly connected with one another, include an angle and are off-set vertically to one another as will be seen from Fig. 1, so that the sound carrier can find room between the two arms 6, 7 and associated pick-ups 4, 5.

As will be clear without saying, the circumferential velocity of the sound carrier disc 1 will be much higher at the outer pick-up than at the inner pick-up (Fig. 2). In the course of recording the circumferential velocities at the pick-ups vary, since the one (4) moves inwards and the other (5) outwards.

A position (Fig. 3) will be reached in the process at which the two pick-ups stand at the same diameter. Upon the further continuation of the movement of the arms 6, 7 the circumferential velocity at the pick-up 4 diminishes further, while that of pick-up 5 increases further. At the end of the movement (Fig. 4) the velocity conditions are just reversed as compared with the beginning of the recording and/or reproducing (Fig. 2).

The off-set arrangement of the pick-ups gives the advantages as initially mentioned.

What we claim as our invention and desire to secure by Letters Patent, is:

1. In a device for magnetically recording or reproducing sound, a magnetizable rotary record disc, a pair of electromagnetic pick-ups connected in the same telephonic circuit and arranged to act upon opposite faces of said record disc, and a bell-crank lever, means for pivotally supporting said bell-crank lever about an axis extending parallel to the axis of rotation of said record disc, said means being arranged outside the circumference of said disc, one arm of said bell-crank lever extending above the upper face of said record disc and the other arm extending below the lower face of said record disc, said pick-ups being secured to the free ends of said arms of said bell-crank lever in a position to be moved across the upper and lower faces respectively, of said record disc upon pivoted movement of said bell-crank lever, the angle formed between the arms of said bell-crank lever and the distance of said pivot means from the axis of rotation being of said record disc such that upon pivotal movement of said bell-crank lever one of said pick-ups is moved in a direction toward the center of said record disc while the other pick-up is moved in a direction away from the center of said record disc.

2. In a device for magnetically recording or reproducing sound, a magnetizable rotary record disc, a pair of electromagnetic pick-ups connected in the same telephonic circuit and arranged to act upon opposite faces of said record disc, a bell-crank lever, means for pivotally supporting said bell-crank lever about an axis extending parallel to the axis of rotation of said record disc, and said means being arranged outside the circumference of said disc, one arm of said bell-crank lever extending above the upper face of said record disc and the other arm extending below the lower face of said record disc, said pick-ups being secured to the free ends of said arms of said bell-crank lever in a position to be moved across the upper and lower faces respectively, of said record disc upon pivoted movement of said bell-crank lever, the angle formed between the arms of said bell-crank lever the distance of said pivot means from the axis of rotation of said record disc being such that upon pivotal movement of said bell-crank lever one of said pick-ups is moved in a direction toward the center of said record disc while the other pick-up is moved in a direction away from the center of said record disc, and means for rotating said rotary disc and pivotally moving said bell crank lever in such a speed relation to each other that the adjacent sound tracks formed on said record disc are spaced from each other a distance which does not exceed .05 millimeter.

3. In a device for magnetically recording or reproducing sound, a magnetizable rotary record disc, means for rotating said disc, a bell-crank lever, means for pivotally supporting said bell-crank lever about an axis outside the circumference of said disc and parallel to the axis of rotation of said disc, the arms of said bell-crank lever extending with their free ends toward said record disc, one arm of said bell-crank lever being arranged on one side of said disc and the other arm on the other side of said disc, and two electromagnetic pick-ups each arranged on the free end of the arms of the bell-crank lever so as to be in operative juxtaposition each with one side of said record disc, one pick-up being positioned near the circumference and the other near the center of said record disc in one end position of said bell-crank lever, means for moving said bell-crank lever about its pivot whereby said pick-ups being moved across the upper and lower faces respectively of said record disc into the other end position of said bell-crank lever in which the formerly outer pick-up is near the center and the formerly inner pick-up is near the circumference of said record disc.

WILLY MÜLLER.
OSKAR GRIMM.

REFERENCES CITED

The following references are of record in the file of this patent:

UNITED STATES PATENTS

| Number | Name | Date |
|---|---|---|
| 893,277 | Stuart | July 14, 1908 |
| 936,490 | Stuart | Oct. 12, 1909 |